United States Patent
Kim et al.

(10) Patent No.: US 10,629,945 B2
(45) Date of Patent: *Apr. 21, 2020

(54) METHOD FOR MANUFACTURING SECONDARY BATTERY AND METHOD FOR MANUFACTURING ELECTRODE ASSEMBLY

(71) Applicant: LG CHEM, LTD., Seoul (KR)

(72) Inventors: Sung Jong Kim, Daejeon (KR); Cha Hun Ku, Daejeon (KR); Tae Kyu Kim, Daejeon (KR); Kyung Taek Kim, Daejeon (KR); Dong Hyun Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 52 days.

This patent is subject to a terminal disclaimer.

(21) Appl. No.: 15/754,678

(22) PCT Filed: Apr. 13, 2017

(86) PCT No.: PCT/KR2017/004019
§ 371 (c)(1),
(2) Date: Feb. 23, 2018

(87) PCT Pub. No.: WO2017/191910
PCT Pub. Date: Nov. 9, 2017

(65) Prior Publication Data
US 2018/0248219 A1    Aug. 30, 2018

(30) Foreign Application Priority Data

May 2, 2016    (KR) .................. 10-2016-0054118

(51) Int. Cl.
*H01M 10/04*    (2006.01)
*H01M 2/36*    (2006.01)
*H01M 2/02*    (2006.01)

(52) U.S. Cl.
CPC ....... *H01M 10/049* (2013.01); *H01M 2/0267* (2013.01); *H01M 2/361* (2013.01);
(Continued)

(58) Field of Classification Search
None
See application file for complete search history.

(56) References Cited

U.S. PATENT DOCUMENTS

| 2011/0097615 A1 | 4/2011 | Goh et al. | |
| 2013/0089771 A1* | 4/2013 | Nishikawa | H01M 2/162 429/145 |

(Continued)

FOREIGN PATENT DOCUMENTS

| DE | 10 2015 010 281 A1 | 3/2016 |
| JP | 2015-118816 A | 6/2015 |

(Continued)

OTHER PUBLICATIONS

Office Action corresponding to European Patent Application No. 17792813.2, dated Mar. 4, 2019, 5 pages.

(Continued)

*Primary Examiner* — Wojciech Haske

(74) *Attorney, Agent, or Firm* — Birch, Stewart, Kolasch & Birch, LLP

(57) ABSTRACT

The present invention relates to a method for manufacturing a secondary battery. The method comprises: a first process (S10) of manufacturing an incomplete electrode assembly; a second process (S20) of preparing a pattern member on which a patterned pressing protrusion is formed; a third process (S30) of stacking the pattern member on an outer surface of the incomplete electrode assembly; a fourth process (S40) of partially pressing the incomplete electrode assembly to pattern-bond an interface between the electrode and the separator and thereby to manufacture a complete (Continued)

electrode assembly; a fifth process (S50) of accommodating the complete electrode assembly into a case; a sixth process (S60) of injecting an electrolyte to impregnate the electrolyte into the electrode assembly; a seventh process (S70) of sealing an unsealed surface to manufacture a secondary battery; and an eighth process (S80) of heating and pressing an entire surface of the secondary battery.

15 Claims, 14 Drawing Sheets

(52) U.S. Cl.
CPC ........... *H01M 2/362* (2013.01); *H01M 2/365* (2013.01); *H01M 10/04* (2013.01); *H01M 10/0404* (2013.01); *H01M 10/0436* (2013.01); *H01M 10/0463* (2013.01); *H01M 10/0468* (2013.01); *H01M 10/0481* (2013.01); *H01M 2/02* (2013.01)

(56) References Cited

U.S. PATENT DOCUMENTS

| 2014/0090236 A1 | 4/2014 | Goh et al. |
| 2014/0093762 A1 | 4/2014 | Goh et al. |

FOREIGN PATENT DOCUMENTS

| KR | 10-2008-0095978 A | 10/2008 |
| KR | 10-1154883 B1 | 6/2012 |
| KR | 10-1161136 B1 | 6/2012 |
| KR | 10-2012-0095122 A | 8/2012 |
| KR | 10-2015-0028537 A | 3/2015 |
| KR | 10-2015-0119628 A | 10/2015 |
| KR | 10-2016-0016040 A | 2/2016 |
| KR | 10-2016-0016174 A | 2/2016 |

OTHER PUBLICATIONS

European Search Report for Appl. No. 17792813.2 dated Jun. 19, 2018.

* cited by examiner

METHOD FOR MANUFACTURING SECONDARY BATTERY AND METHOD FOR MANUFACTURING ELECTRODE ASSEMBLY

CROSS-REFERENCE TO RELATED APPLICATION

The present application claims the benefit of the priority of Korean Patent Application No. 10-2016-0054118, filed on May 2, 2016, which is hereby incorporated by reference in its entirety.

TECHNICAL FIELD

The present invention relates to a method for manufacturing a secondary battery, and more particularly, to a method for manufacturing a secondary battery, which improves impregnation of an electrolyte to be injected into an interface between an electrode and a separator to remove an unreacted area when charged and discharged.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

A secondary battery comprises an electrode assembly, an electrolyte, and a case in which the electrode assembly and the electrolyte are accommodated. The electrode assembly is manufactured by alternately stacking a plurality of electrodes and a plurality of separators.

The secondary battery comprising the above-described constituents may be manufactured through a process of inserting the electrode assembly into the case, a process of injecting the electrolyte into the case in which the electrode assembly is accommodated, and a process of sealing an opening of the case.

Here, the electrolyte injected into the case may be impregnated into the electrode assembly to improve performance of the electrode assembly.

However, in the secondary battery, the electrolyte is not absorbed up to the inside of the electrode assembly by resistance due to bonding force of the interface between the electrode and the separator to limit improvement in performance of the electrode assembly.

The present invention has been made to solve the above-mentioned problem, and an object of the prevent invention is to provide a method for manufacturing a secondary battery, which comprises a process of forming a nonbonding portion in an interface between an electrode and a separator to improve impregnation of an electrolyte and thereby to performance of the electrode assembly.

Another object of the present invention is to provide a method for manufacturing a secondary battery, which further comprises a process of bonding a nonbonding portion formed on an interface between an electrode and a separator to remove an unreacted area when charged and discharged, thereby improving performance of the electrode assembly.

Technical Solution

To achieve the abovementioned object, a method for manufacturing a secondary battery according to an embodiment of the present invention comprises: a first process (S10) of manufacturing an incomplete electrode assembly in which a plurality of electrodes and a plurality of separators are alternately stacked; a second process (S20) of preparing a pattern member on which a patterned pressing protrusion is formed; a third process (S30) of stacking the pattern member on an outer surface of the incomplete electrode assembly so that the pressing protrusion faces the incomplete electrode assembly; a fourth process (S40) of partially pressing the incomplete electrode assembly through the pattern member on which the patterned pressing protrusion is formed to pattern-bond an interface between the electrode and the separator and thereby to manufacture a complete electrode assembly in which a bonding portion and a non-bonding portion coexist on the interface between the electrode and the separator; a fifth process (S50) of accommodating the complete electrode assembly into a case; a sixth process (S60) of injecting an electrolyte through an opening of the case to impregnate the electrolyte into the electrode assembly, wherein the electrolyte is permeated into non-bonding portion of the interface between the electrode and the separator and impregnated up to the inside of the electrode assembly; a seventh process (S70) of sealing an unsealed surface in which the opening of the case is formed to manufacture a secondary battery; and an eighth process (S80) of heating and pressing an entire surface of the secondary battery to bond the nonbonding portion of the interface between the electrode and the separator.

The plurality of electrodes may be provided with a first electrode and a second electrode, and the plurality of separators may be provided with a first separator and a second separator.

The incomplete electrode assembly may comprise a radical unit in which a first electrode, a first separator, a second electrode, and a second separator are sequentially stacked or have a structure in which at least two or more radical units are stacked.

The incomplete electrode assembly may be provided with a first radical unit and a second radical unit, which are vertically stacked with a separation sheet therebetween, the first radical unit may have a structure in which the first electrode, the first separator, the second electrode, the second separator, and the first electrode are sequentially stacked, and the second radical unit may have a structure in which the second electrode, the second separator, the first electrode, the first separator, and the second electrode are sequentially stacked.

The first electrode may be a negative electrode, and the second electrode may be a positive electrode.

The second process (S20) may comprise a process of preparing a film member to form a patterned pressing protrusion on one surface of the prepared film member and thereby to manufacture a pattern member.

The second process (S20) may comprise a process of partially cutting one surface of the film member through a laser device to form the patterned pressing protrusion.

The second process (S20) may comprise a process of partially applying a coating solution to one surface of the film member through a coating device to form the patterned pressing protrusion.

The pressing protrusion may be formed in a longitudinal direction of the pattern member to form a bonding portion that is patterned in a linear shape on the interface between the electrode and the separator.

In the fourth process (S40), the pattern member may be heated and pressed through a pressing roller.

The eighth process (S80) may be performed by a heating and pressing device that heats and presses both surfaces of the secondary battery at the same time.

The heating and pressing device may comprise a pressing body on which the secondary battery is mounted and a pressing part comprising a heat generation plate that heats and presses the secondary battery mounted on the pressing body.

The heat generation plate may be provided as a metal plate comprising a built-in heating wire.

In the seventh process (S70), an unsealed surface in which an opening of the case is formed may be press-fitted, and simultaneously, heat may be applied to the unsealed surface to seal an entire sealing surface.

After the eighth process (S80), the method may further comprise a ninth process (S90) of charging and discharging the secondary battery to manufacture the complete secondary battery.

That is, a method for manufacturing a secondary battery according to an embodiment of the present invention comprises: a first process (S10) of manufacturing an incomplete electrode assembly in which a plurality of electrodes and a plurality of separators are alternately stacked; a second process (S20) of preparing a pattern member on which a patterned pressing protrusion is formed; a third process (S30) of stacking the pattern member on an outer surface of the incomplete electrode assembly so that the pressing protrusion faces the incomplete electrode assembly; and a fourth process (S40) of partially pressing the incomplete electrode assembly through the pattern member on which the patterned pressing protrusion is formed to pattern-bond an interface between the electrode and the separator and thereby to manufacture a complete electrode assembly in which a bonding portion and a nonbonding portion coexist on the interface between the electrode and the separator.

The second process (S20) may comprise a process of preparing a film member to form a patterned pressing protrusion on one surface of the prepared film member and thereby to manufacture a pattern member.

The second process (S20) may comprise a process of partially cutting one surface of the film member through a laser device to form the patterned pressing protrusion.

The second process (S20) may comprise a process of partially applying a coating solution to one surface of the film member through a coating device to form the patterned pressing protrusion.

The fourth process (S40) may heat and press the pattern member by using a pressing roller.

Advantageous Effects

The present invention has effects as follows.

First: in the present invention, the electrode assembly provided with the plurality of electrodes and the plurality of separators may be partially heated and pressed to pattern-bond the interface between the electrode and the separator, thereby improving the impregnation of the electrolyte because the electrolyte is permeated into the nonbonding space of the interface between the electrode and the separator when the electrolyte is impregnated into the electrode assembly.

Second: in the present invention, the electrode assembly may be partially heated and pressed by using the pattern member on which the patterned pressing protrusion is formed to easily pattern-bond the interface between the electrode and the separator.

Third: in the present invention, the interface between the electrode and the separator may be patterned to be bonded in the longitudinal direction of the electrode assembly and thereby to improve the efficiency in pattern operation and particularly increase the permeation of the electrolyte, thereby improving the impregnation of the electrolyte.

Fourth: in the present invention, the secondary battery comprising the pattern-bonded electrode assembly may be heated and pressed to bond the nonbonding portion of the interface between the electrode and the separator, which are provided in the electrode assembly, to improve the charging and discharging efficiency without the unreacted area when the secondary battery is charged and discharged.

Fifth: in the present invention, the secondary battery comprising the pattern-bonded electrode assembly may be heated and pressed by using the heating and pressing device to easily bond the nonbonding portion of the interface between the electrode and the separator.

MODE FOR CARRYING OUT THE INVENTION

Figure 1:
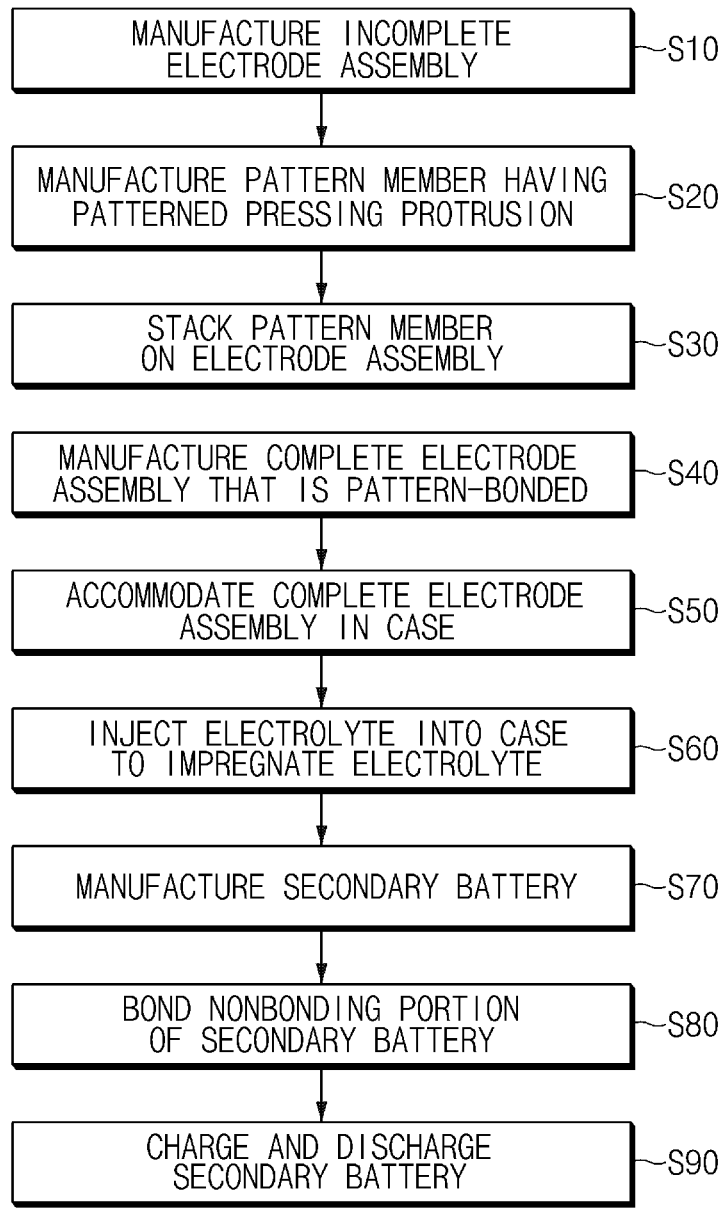
FIG. 1 is a flowchart illustrating a method for manufacturing a secondary battery according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Method for manufacturing secondary battery]

As illustrated in FIGS. 1 to 14, a method for manufacturing a secondary battery according to the present invention comprises a first process (S10) of manufacturing an incomplete electrode assembly 10' in which a plurality of electrodes and a plurality of separators are alternately stacked, a second process (S20) of preparing a pattern member 100, a third process (S30) of stacking the pattern member 100 on the incomplete electrode assembly 10', a fourth process (S40) of partially heating and pressing the incomplete electrode assembly 10' through the pattern member 100 to manufacture a complete electrode assembly 10 in which an interface between the electrode and the separator is pattern-bonded, a fifth process (S50) of accommodating the complete electrode assembly 10 into a case 20, a sixth process (S60) of injecting an electrolyte 30 through an opening 21 of the case 20 to impregnate the electrolyte 30 into the electrode assembly 10, wherein the electrolyte 30 is permeated into nonbonding portion 10b of the interface between the electrode and the separator and impregnated up to the inside of the electrode assembly 10, a seventh process (S70) of sealing an unsealed surface in which the opening 21 of the case 20 is formed to manufacture a secondary battery 1, an eighth process (S80) of heating and pressing an entire surface of the secondary battery 1 to bond the nonbonding portion 10b of the interface between the electrode and the separator, and a ninth process (S90) of charging and discharging the secondary battery 1 to activate the secondary battery 1.

First Process (S10)

Figure 2:
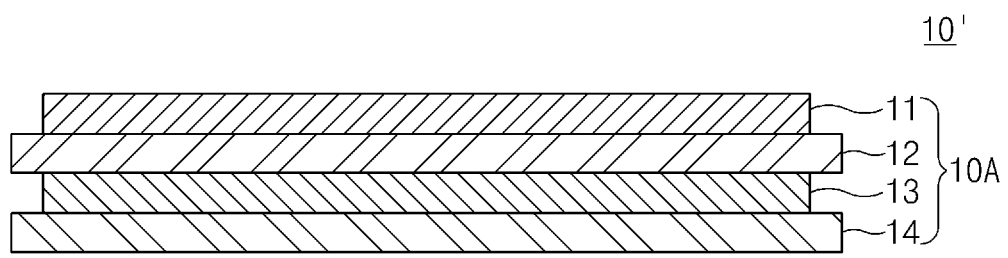
FIG. 2 is a view illustrating a first example of an incomplete electrode assembly in the method for manufacturing the secondary battery according to an embodiment of the present invention.
Figure 3:
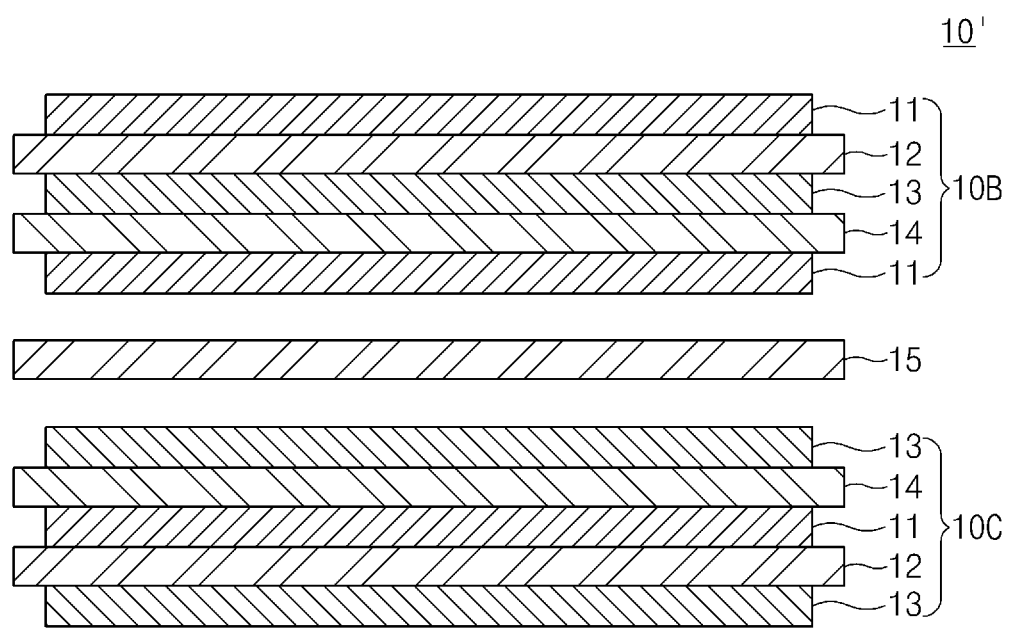
FIG. 3 is a view illustrating a second example of the incomplete electrode assembly in the method for manufacturing the secondary battery according to an embodiment of the present invention.

As illustrated in FIGS. 2 and 3, the first process (S10) is a process of manufacturing the incomplete electrode assembly 10'. That is, in the first process (S10), the plurality of electrodes and the plurality of separators are alternately stacked to manufacture the incomplete electrode assembly 10'.

Here, in the incomplete electrode assembly 10', the plurality of electrodes are provided with a first electrode 11 and a second electrode 13, and the plurality of separators are provided with a first separator 12 and a second separator 14.

According to a first embodiment, as illustrated in FIG. 2, the incomplete electrode assembly 10' comprises a radical unit 10A in which a first electrode 11, a first separator 12, a second electrode 13, and a second separator 14 are sequentially stacked or has a structure at least two or more radical units 10A are stacked.

According to a second embodiment, as illustrated in FIG. 3, the incomplete electrode assembly 10' is provided with a first radical unit 10B and a second radical unit 10C, which are vertically stacked with a separation sheet 15 therebetween. The first radical unit 10B has a structure in which the first electrode 11, the first separator 12, the second electrode 13, the second separator 14, and the first electrode 11 are sequentially staked, and the second radical unit 10C has a structure in which the second electrode 13, the second separator 14, the first electrode 11, the first separator 12, and the second electrode 13 are sequentially stacked.

Here, the first electrode may be a negative electrode, and the second electrode may be a positive electrode. Thus, the incomplete electrode assembly 10' in which the negative electrode and the positive electrode are stacked with the separator therebetween may be manufactured.

The present invention will be described with reference to the incomplete electrode assembly 10' manufactured according to the first embodiment.

Second Process (S20)

Figure 4:
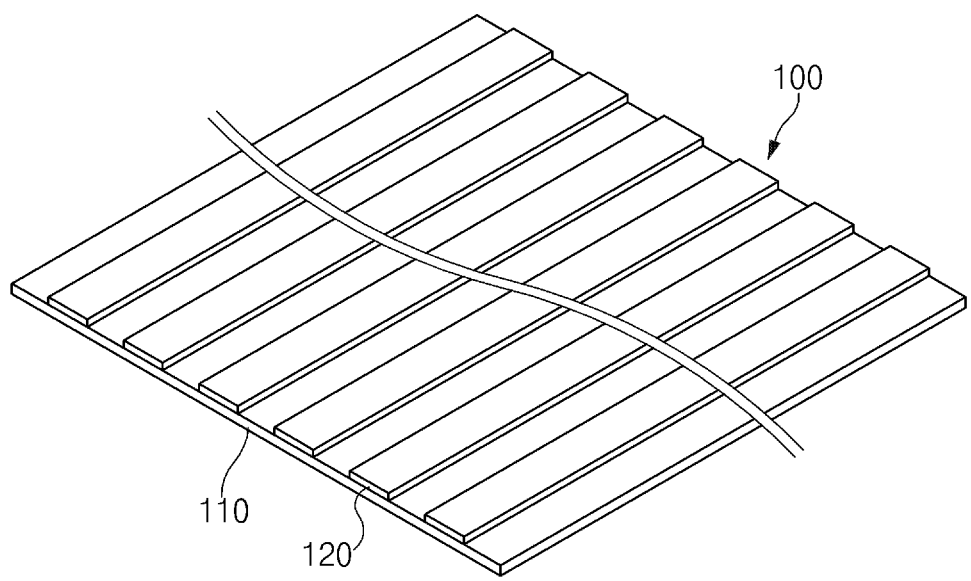
FIG. 4 is a perspective view of a pattern member in the method for manufacturing the secondary battery according to an embodiment of the present invention.

As illustrated in FIG. 4, in the second process (S20), the pattern member 100 having one surface on which a patterned pressing protrusion 120 is formed is prepared. Here, referring to FIG. 4, the pattern member 100 is provided with a film member 110 and the patterned pressing protrusion 120 formed on one surface of the film member 110.

In the second process (S20), the film member 110 having a predetermined length may be prepared, and then, the pressing protrusion 120 patterned in a longitudinal direction may be formed on one surface of the film member 110 to manufacture the pattern member 100.

Here, the patterned pressing protrusion 120 may be formed through a laser device (not shown) or a coating device (not shown).

According to a first embodiment, in the second process (S20), one surface of the film member 110 may be partially cut through the laser device to form the patterned pressing protrusion 120, thereby manufacturing the pattern member 100 in which the film member 110 and the pressing protrusion 120 are integrated with each other. The pattern member 100 manufactured as described above may be low in manufacturing cost and increase bonding strength between the film member 110 and the pressing protrusion 120.

According to a second embodiment, in the second process (S20), a coating solution may be partially applied to one surface of the film member 110 through the coating device to form the patterned pressing protrusion 120, thereby manufacturing the pattern member 100 in which the pressing protrusion 120 is applied to the film member 110. The pattern member 110 manufactured as described above may be easily manufactured.

The pattern pressing protrusion 120 may be lengthily formed in the longitudinal direction of the film member 110 to form a bonding portion, which is patterned in a linear shape, on the interface between the electrode and the separator.

Third Process (S30)

Figure 5:
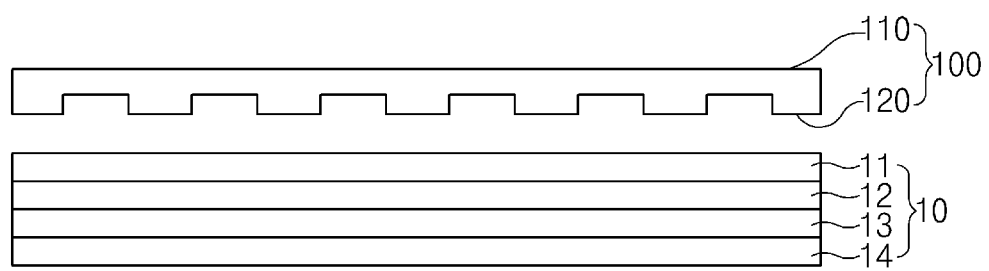
FIG. 5 is a cross-sectional view of the electrode assembly on which the pattern member of FIG. 4 is stacked.

As illustrated in FIG. 5, in the third process (S30), the pattern member 100 is stacked on the electrode 10. That is, the pattern member 100 is disposed on an outer surface of the incomplete electrode assembly 10', i.e., a top surface when viewed in FIG. 5 so that the pressing protrusion 120 faces the incomplete electrode assembly 10'.

Fourth Process (S40)

Figure 6:
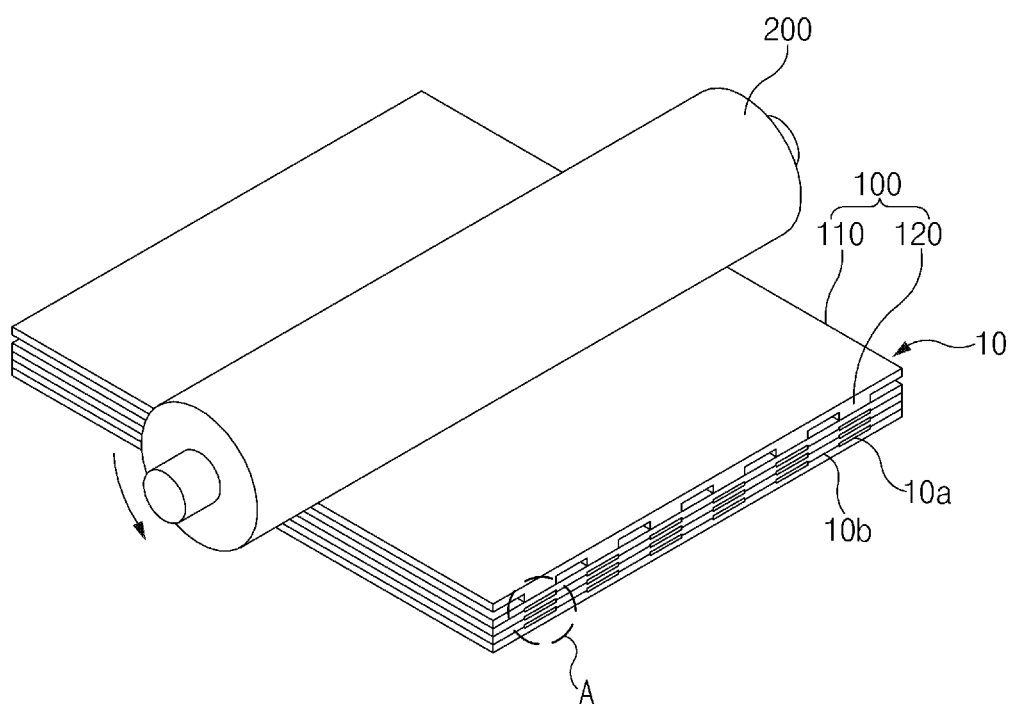
FIG. 6 is a view illustrating a fourth process of manufacturing a complete electrode assembly in the method for manufacturing the secondary battery according to an embodiment of the present invention.

As illustrated in FIG. 6, the fourth process (S40) is a process of manufacturing the complete electrode assembly in which the bonding portion and the nonbonding portion coexist together with each other. The incomplete electrode assembly 10' is partially pressed through the pattern member 100, on which the patterned pressing protrusion 120 is formed, to pattern-bond the interface between the electrode and the separator, thereby manufacturing the complete electrode assembly 100 in which the bonding portion 10a and the nonbonding portion 10b coexist with each other.

Here, the incomplete electrode assembly 10' on which the pattern member 100 is stacked may be pressed through a pressing roller 200.

For example, as illustrated in FIG. 6, in the fourth process (S40), the pressing roller 200 descends to press one end of the pattern member 100 stacked on the top surface of the incomplete electrode assembly 10'. In this state, when the pressing roller 200 moves to the outer end of the pattern member 100 while rotating, the pattern member 100 is pressed by the pressing roller 200, and also, the top surface of the electrode assembly 10 is partially pressed by the pressing roller 120 that is pattered by the pattern member 100 to manufacture the complete electrode assembly 10 in which the interface between the electrode and the separator is partially bonded.

Figure 7:
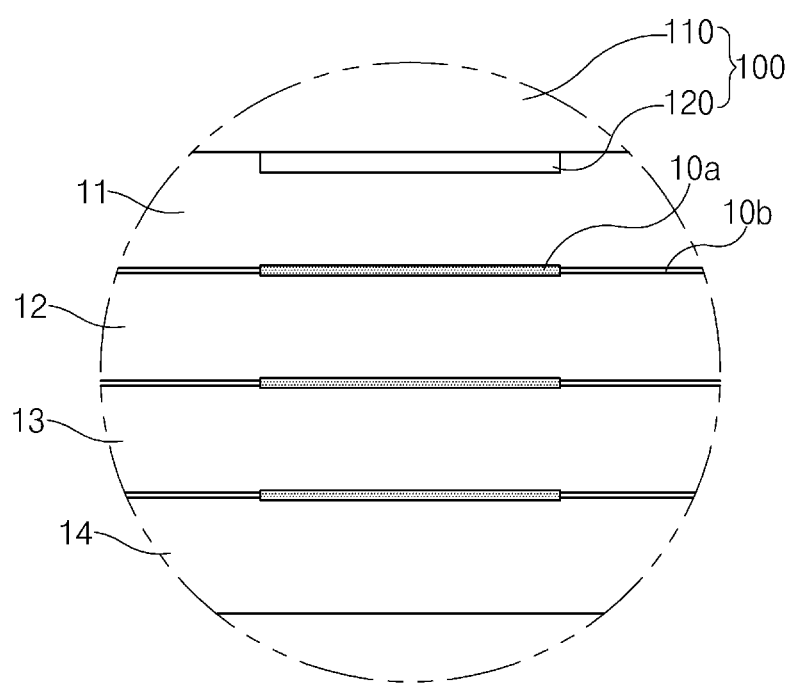
FIG. 7 is an enlarged view of a portion 'A' illustrated in FIG. 6.

That is, as illustrated in FIG. 7, the interface between the electrode and the separator, which is pressed by the pressing protrusion 120, is bonded to form the bonding portion 10a, and the interface between the electrode and the separator, which is not pressed by the pressing protrusion 120, forms the nonbonding portion 10b.

Here, the pressing roller 200 may heat and press the pattern member 100 to improve bonding force of the interface between the electrode and the separator.

The pressing protrusion 120 may be formed on the pattern member 100 in a longitudinal direction to form the bonding portion 10a that is linearly patterned on the interface between the electrode and the separator in the longitudinal direction. Also, the nonbonding portion 10b having the linear shape is formed on the interface between the electrode and the separator, which is not pressed by the pressing protrusion 120, in the longitudinal direction.

Although the electrode assembly having a predetermined size is described as one embodiment in an embodiment of the present invention, an electrode assembly on which an electrode sheet and a separator sheet are stacked may also be pattern-bonded through the pattern member 100.

Fifth Process (S50)

Figure 8:
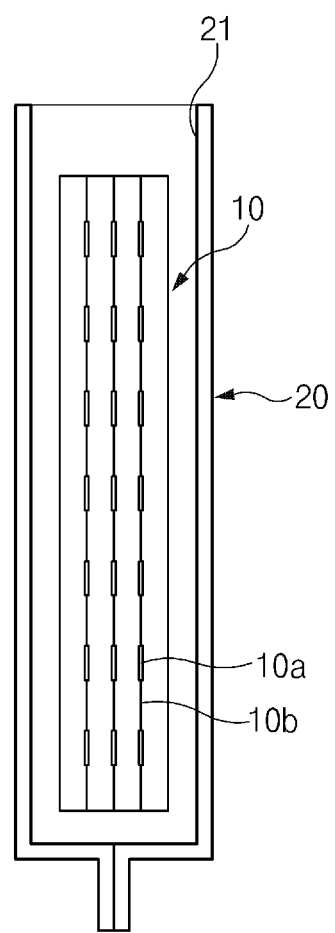
FIG. 8 is a view illustrating a fifth process of accommodating the complete electrode assembly into a case in the method for manufacturing the secondary battery according to an embodiment of the present invention.

As illustrated in FIG. 8, in the fifth process (S50), the electrode assembly 10 is accommodated into the case 20. Here, the pattern member 100 stacked on the complete electrode assembly 10 is removed, and then, the complete electrode assembly 19 (hereinafter, referred to as an electrode assembly 10) is accommodated into the case 20. That is, in a state in which an electrode tab provided in the electrode assembly 10 is led out to the outside of the electrode assembly 10, the electrode assembly 10 is inserted through an opening 21 of the case 20.

Sixth Process (S60)

Figure 9:
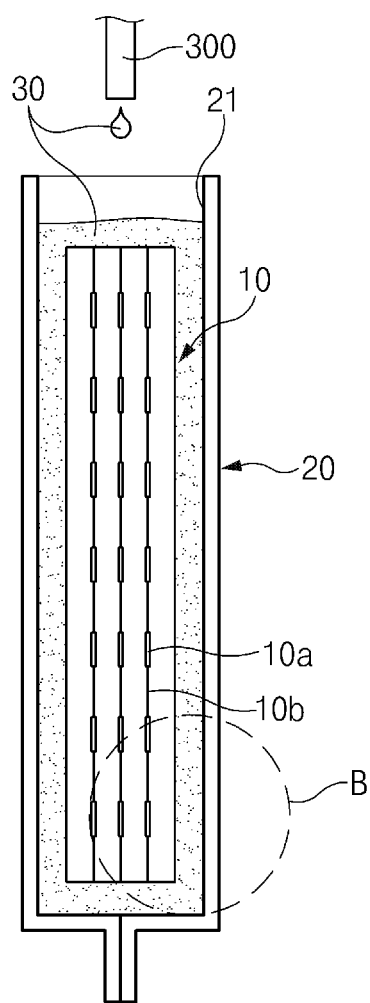
FIG. 9 is a view illustrating a sixth process of injecting an electrolyte into the case in the method for manufacturing the secondary battery according to an embodiment of the present invention.

As illustrated in FIG. 9, the sixth process (S60) is a process of injecting an electrolyte 30 into the case 20. That is, the electrolyte 30 is injected into the case 20, in which the electrode assembly 10 is accommodated, to impregnate the electrolyte 30 into the electrode assembly 10.

Figure 10:
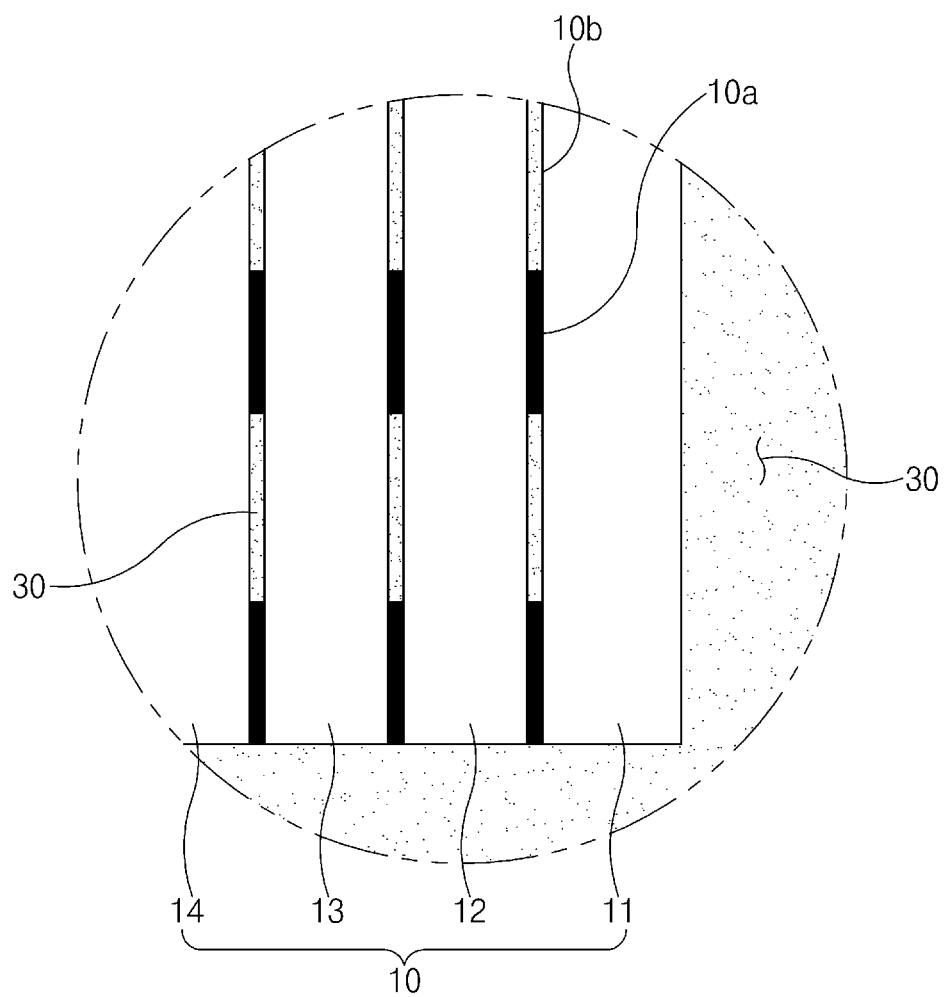
FIG. 10 is an enlarged view of a portion 'B' illustrated in FIG. 9.

For example, as illustrated in FIG. 9, in the sixth process (S60), the case 20 is fixed so that the opening 21 faces an upper side, an electrolyte injection device 200 is disposed in the opening 21 of the case 20, and the electrolyte 30 is injected through the opening 21 of the case 20 by using the electrolyte injection device 300. Thus, the electrolyte 30 injected into the case 20 is absorbed and impregnated into the electrode assembly 10. Particularly, as illustrated in FIG. 10, the electrolyte 30 is permeated into the nonbonding portion 10b of the interface between the electrode and the separator and then impregnated up to the inside of the electrode assembly 10.

Furthermore, the nonbonding portion 10b may be formed in the linear shape to improve the permeation of the electrolyte 30.

That is, the method for manufacturing the secondary battery according to the present invention may have a technical feature in which the nonbonding portion 10b is formed so that the electrolyte 30 is permeated into the interface between the electrode and the separator. Thus, the impregnation of the electrolyte 30 into the electrode assembly 10 may be significantly improved by the nonbonding portion 10b.

Seventh Process (S70)

Figure 11:
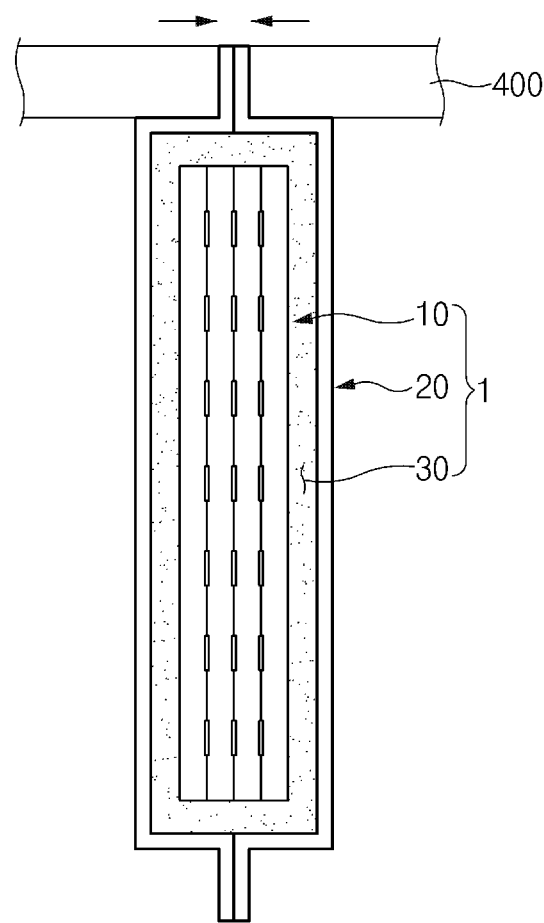
FIG. 11 is a view illustrating a seventh process of sealing an opening of the case to manufacture the secondary battery in the method for manufacturing the secondary battery according to an embodiment of the present invention.

As illustrated in FIG. 11, in the seventh process (S70), the case 20 is sealed to be airtight. That is, in the seventh process (S70), the unsealed surface in which the opening 21 of the case 20 is formed is sealed to manufacture the secondary battery 1.

For example, as illustrated in FIG. 11, in the seventh process (S70), the unsealed surface of the case 20 in which the electrode assembly 10 and the electrolyte 30 are accommodated may be sealed to be airtight by applying heat and a pressure through a thermal fusion device 400, thereby manufacturing the secondary battery 1.

Eighth Process (S80)

Figure 12:
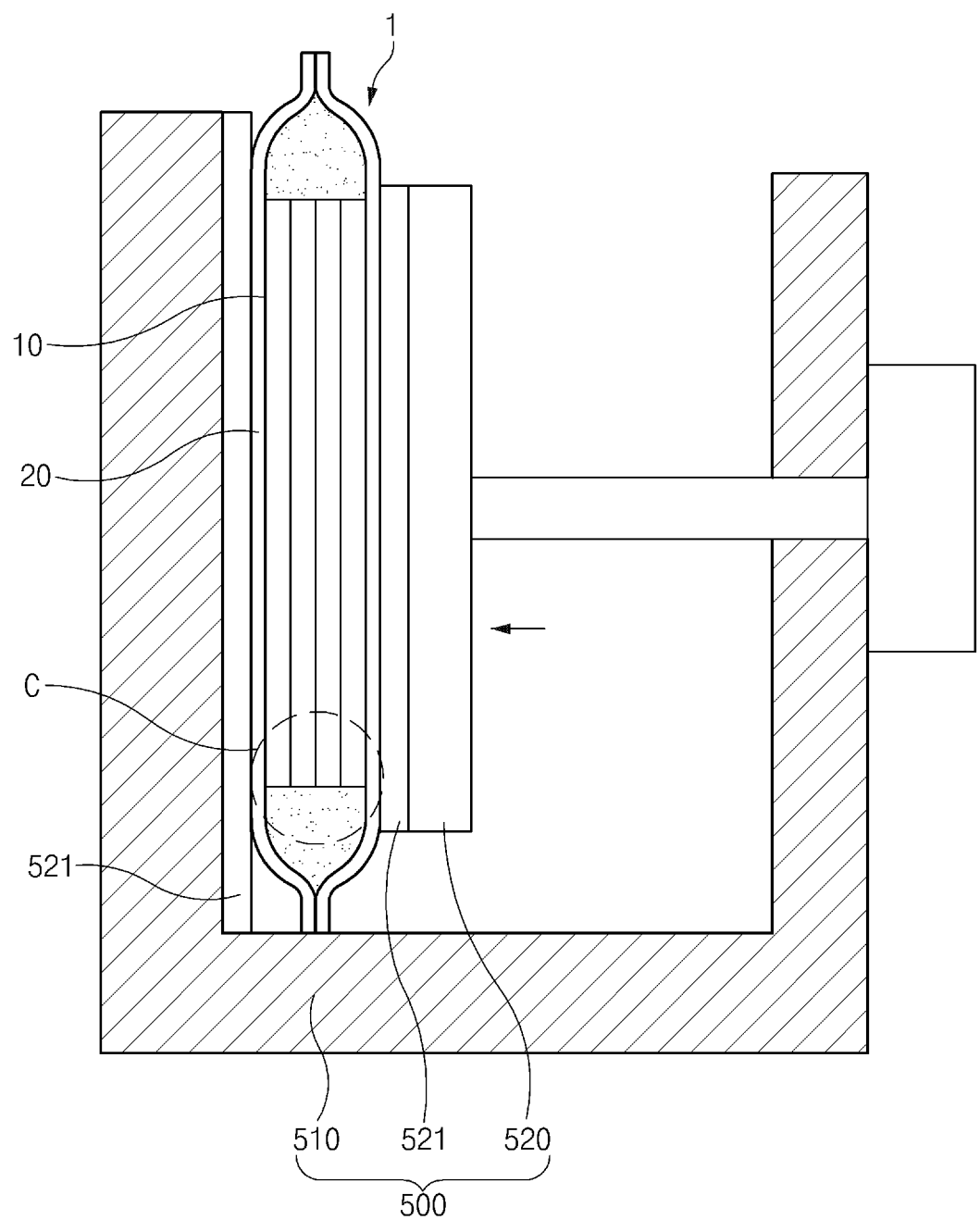
FIG. 12 is a view illustrating an eighth process of heating and pressing the secondary battery in the method for manufacturing the secondary battery according to an embodiment of the present invention.

As illustrated in FIG. 12, in the eighth process (S80), the nonbonding portion 10b of the interface between the electrode and the separator is bonded. That is, the entire surface of the secondary battery 1 is heated and pressed to bond the nonbonding portion 10b of the interface between the electrode and the separator.

For example, as illustrated in FIG. 12, the eighth process (S80) is performed through a heating and pressing device 500 that heats and presses both surfaces of the secondary battery 1 at the same time.

Here, the heating and pressing device 500 comprises a pressing body 510 on which the secondary battery 1 is mounted and a pressing part 520 comprising a heat generation plate 521 that heats and presses a surface of the secondary battery 1 mounted on the pressing body 510. Alternatively, the heat generation plate 521 is provided between a wall of the pressing body 510 and the surface of the secondary battery 1.

Figure 13:
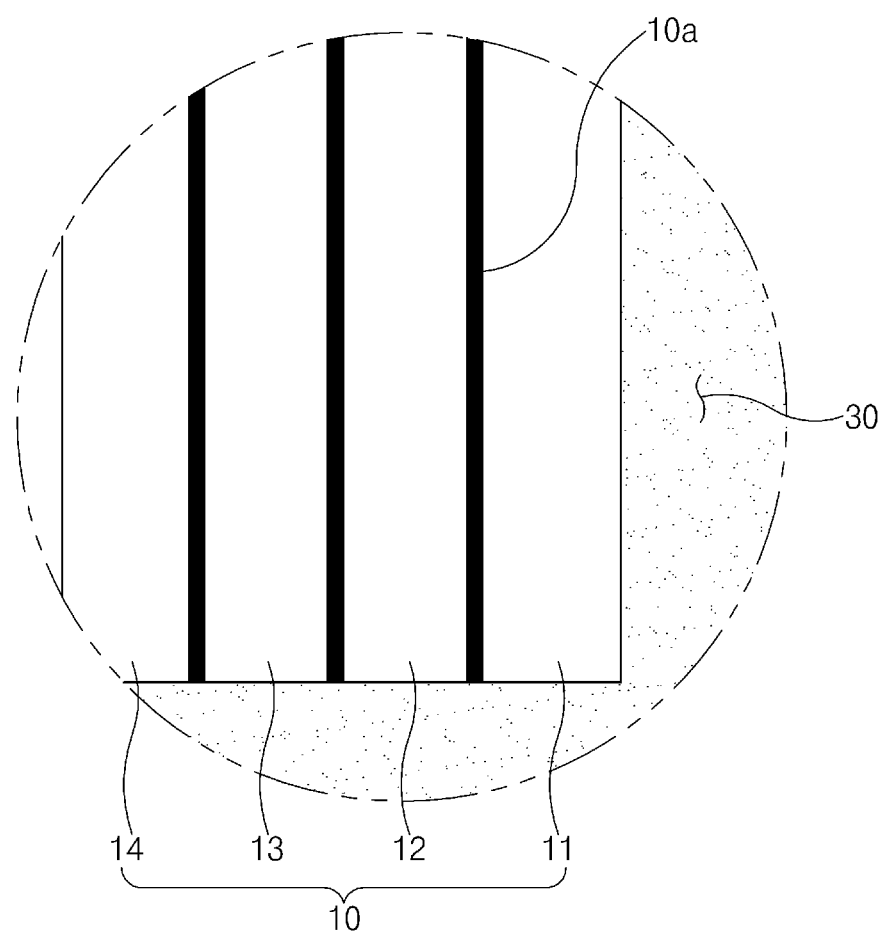
FIG. 13 is an enlarged view of a portion 'C' illustrated in FIG. 12.

That is, as illustrated in FIG. 13, the heating and pressing device 500 presses an entire surface of the secondary battery 1, on which the pressing body 510 is mounted, through the pressing part 520 to closely attach the electrode to the separator so that the nonbonding portion 10b is not formed on the interface between the electrode and the separator. In this state, the nonbonding portion 10b of the interface between the electrode and the separator is bonded by using high-temperature heat generated in the heat generation plate 521. Thus, the entire interface between the electrode and the separator may be bonded.

Ninth Process (S90)

Figure 14:
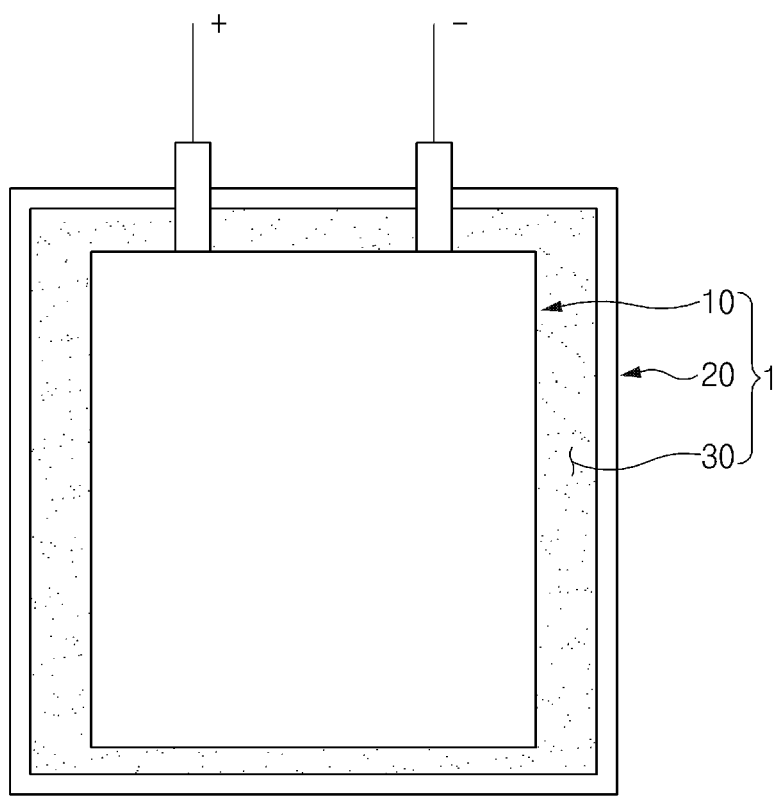
FIG. 14 is a view illustrating a ninth process of charging and discharging the secondary battery in the method for manufacturing the secondary battery according to an embodiment of the present invention.

As illustrated in FIG. 14, in the ninth process (S90), the secondary battery 1 is charged and discharged and then activated. That is, power is supplied to a positive electrode tab and a negative electrode tab of the secondary battery 1 to continuously perform the charging and discharging, thereby activating the secondary battery 1.

Here, the entire interface between the electrode and the separator may be bonded without forming an unreacted area to improve performance of the secondary battery.

That is, in the method for manufacturing the secondary battery according to the present invention, the nonbonding portion formed on the interface between the electrode and the separator may be bonded to improve the impregnation of the electrolyte and thereby to remove the unreacted area when charged and discharged, thereby improving the performance of the secondary battery.

The method for manufacturing the secondary battery comprising the above-described constituents may achieve the improvement in impregnation of the electrolyte and the improvement in performance of the secondary battery.

Hereinafter, in description of a secondary battery according to another embodiment of the present invention, constituents having the same configuration and function have been given with the same reference numeral in the drawings, and thus their duplicated descriptions will be omitted.

[Method for Manufacturing Electrode Assembly]

In the present invention, only the method for manufacturing the electrode assembly may be separately performed.

Referring to FIGS. 1 to 4, a method for manufacturing an electrode assembly according to this embodiment comprises a first process (S10) of manufacturing an incomplete electrode assembly 10' in which a plurality of electrodes and a plurality of separators are alternately stacked, a second process (S20) of preparing a pattern member 100, a third process (S30) of stacking the pattern member 100 on the incomplete electrode assembly 10', and a fourth process (S40) of partially heating and pressing the incomplete electrode assembly 10' through the pattern member 100 to manufacture a complete electrode assembly 10 in which an interface between the electrode and the separator is pattern-bonded.

That is, the incomplete electrode assembly 10' manufactured in the first process' (S10) is partially heated and pressed through the pattern member 100 prepared in the second process (S20) to manufacture the complete electrode assembly 10 in which the interface between the electrode and the separator is pattern-bonded.

The first process (S10), the second process (S20), the third process (S30), and the fourth process (S40) are the same as the first process (S10), the second process (S20), the third process (S30), and the fourth process (S40), which are described in the abovementioned method for manufacturing the secondary battery, and thus, their detailed descriptions will be omitted.

As described above, in the method for manufacturing the electrode assembly according to this embodiment, the electrode assembly 10 having the patterned bonding portion on the interface between the electrode and the separator may be manufactured.

Accordingly, the scope of the present invention is defined by the appended claims rather than the foregoing description and the exemplary embodiments described therein.

Various modifications made within the meaning of an equivalent of the claims of the invention and within the claims are to be regarded to be in the scope of the present invention.

The invention claimed is:

1. A method for manufacturing a secondary battery, the method comprising:
   a first process (S10) of manufacturing an incomplete electrode assembly in which a plurality of electrodes and a plurality of separators are alternately stacked;
   a second process (S20) of preparing a pattern member on which a patterned pressing protrusion is formed;
   a third process (S30) of stacking the pattern member on an outer surface of the incomplete electrode assembly so that the pressing protrusion faces the incomplete electrode assembly;
   a fourth process (S40) of partially pressing the incomplete electrode assembly through the pattern member on which the patterned pressing protrusion is formed to pattern-bond an interface between the electrode and the separator and thereby to manufacture a complete electrode assembly in which a bonding portion and a nonbonding portion coexist on the interface between the electrode and the separator;
   a fifth process (S50) of accommodating the complete electrode assembly into a case;
   a sixth process (S60) of injecting an electrolyte through an opening of the case to impregnate the electrolyte into the electrode assembly, wherein the electrolyte is permeated into nonbonding portion of the interface between the electrode and the separator and impregnated up to the inside of the electrode assembly;
   a seventh process (S70) of sealing an unsealed surface in which the opening of the case is formed to manufacture a secondary battery; and
   an eighth process (S80) of heating and pressing an entire surface of the secondary battery to bond the nonbonding portion of the interface between the electrode and the separator.

2. The method of claim 1, wherein the plurality of electrodes are provided with a first electrode and a second electrode, and the plurality of separators are provided with a first separator and a second separator.

3. The method of claim 2, wherein the incomplete electrode assembly is provided with a first radical unit and a second radical unit, which are vertically stacked with a separation sheet therebetween,
   the first radical unit has a structure in which the first electrode, the first separator, the second electrode, the second separator, and the first electrode are sequentially stacked, and
   the second radical unit has a structure in which the second electrode, the second separator, the first electrode, the first separator, and the second electrode are sequentially stacked.

4. The method of claim 2, wherein the first electrode is a negative electrode, and the second electrode is a positive electrode.

5. The method of claim 1, wherein the incomplete electrode assembly comprises a radical unit in which a first electrode, a first separator, a second electrode, and a second separator are sequentially stacked or has a structure in which at least two or more radical units are stacked.

6. The method of claim 1, wherein the second process (S20) comprises a process of preparing a film member to form a patterned pressing protrusion on one surface of the prepared film member and thereby to manufacture a pattern member.

7. The method of claim 6, wherein the second process (S20) comprises a process of partially cutting one surface of the film member through a laser device to form the patterned pressing protrusion.

8. The method of claim 6, wherein the second process (S20) comprises a process of partially applying a coating solution to one surface of the film member through a coating device to form the patterned pressing protrusion.

9. The method of claim 1, wherein the pressing protrusion is formed in a longitudinal direction of the pattern member to form a bonding portion that is patterned in a linear shape on the interface between the electrode and the separator.

10. The method of claim 1, wherein, in the fourth process (S40), the pattern member is heated and pressed through a pressing roller.

11. The method of claim 1, wherein the eighth process (S80) is performed by a heating and pressing device that heats and presses both surfaces of the secondary battery at the same time.

12. The method of claim 11, wherein the heating and pressing device comprises a pressing body on which the secondary battery is mounted and a pressing part comprising a heat generation plate that, heats and presses the secondary battery mounted on the pressing body.

13. The method of claim 12, wherein the heat generation plate is provided as a metal plate comprising a built-in heating wire.

14. The method of claim 1, wherein, in the seventh process (S70), an unsealed surface in which an opening of the case is formed is press-fitted, and simultaneously, heat is applied to the unsealed surface to seal an entire sealing surface.

15. The method of claim 1, after the eighth process (S80), further comprising a ninth process (S90) of charging and discharging the secondary battery to manufacture the complete secondary battery.

* * * * *